Feb. 12, 1946.                C. W. HALL                 2,394,767
                              ROTARY VALVE
                        Filed Aug. 22, 1944         2 Sheets-Sheet 2
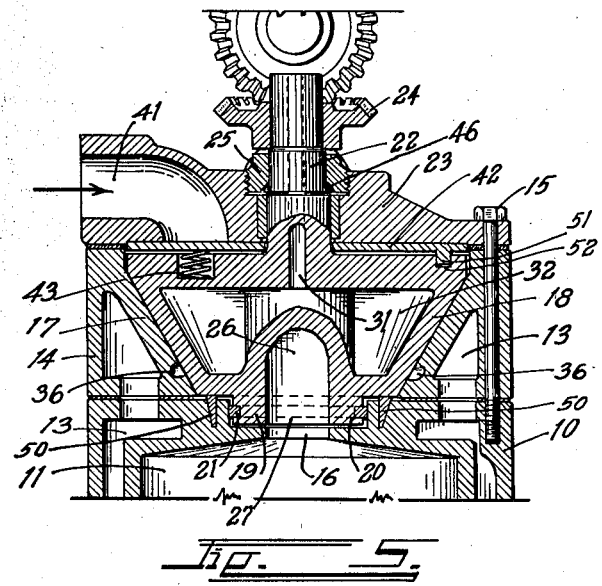
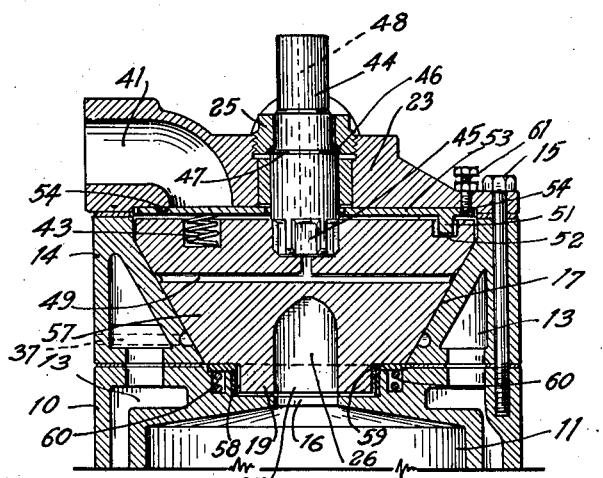
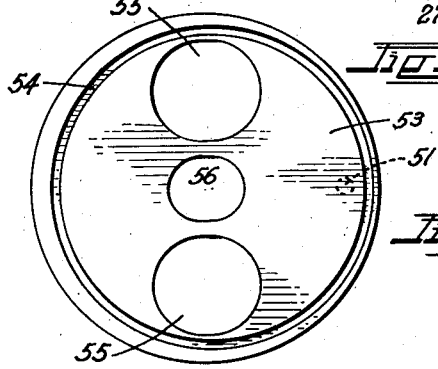
INVENTOR.
CHARLES W. HALL.
BY
                ATTORNEY.

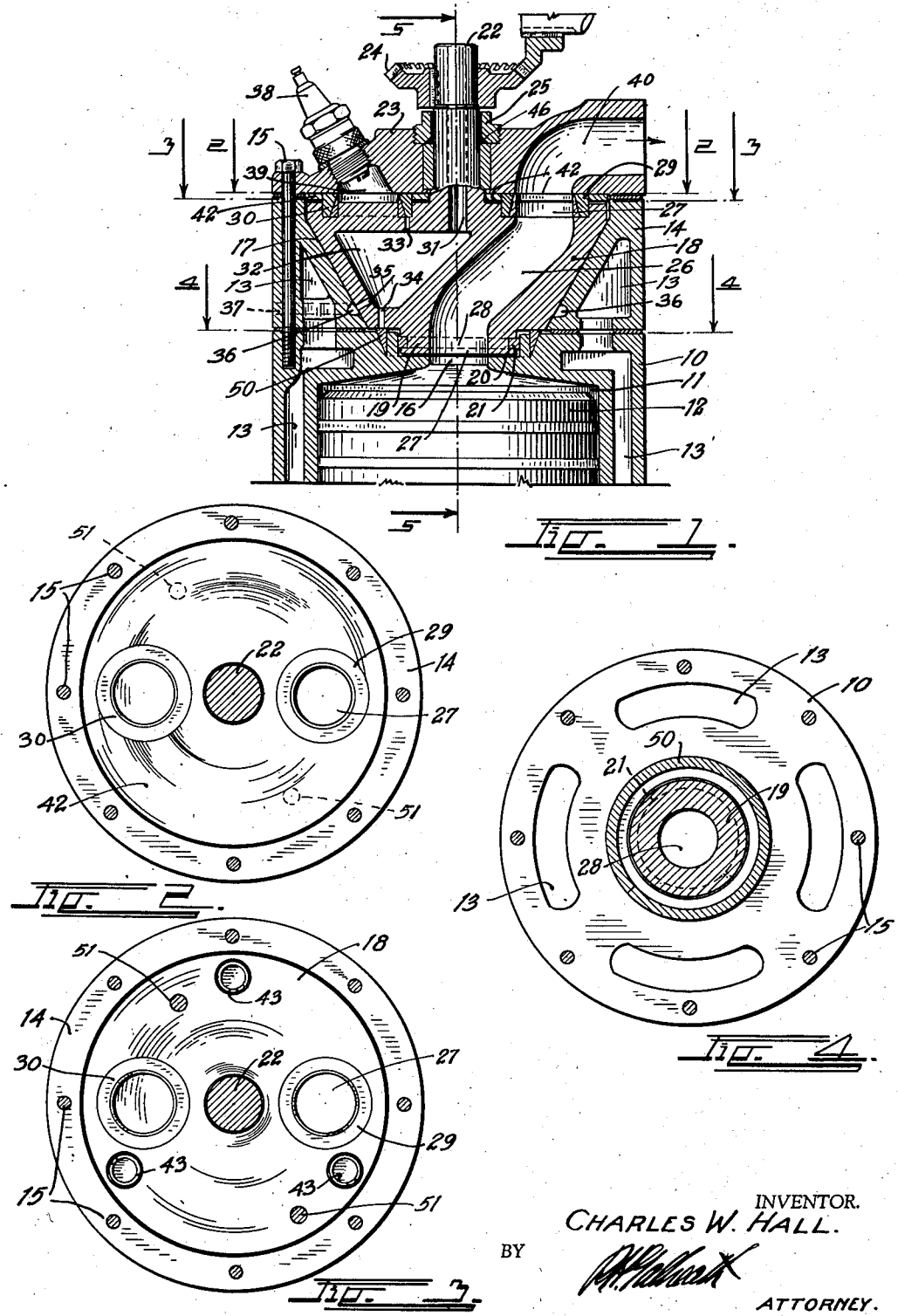

Patented Feb. 12, 1946

2,394,767

UNITED STATES PATENT OFFICE 2,394,767

ROTARY VALVE

Charles W. Hall, Denver, Colo., assignor, by direct and mesne assignments, of one-half to E. Clifford Heald and one-half to Victor B. Ginsberg, both of Denver, Colo.

Application August 22, 1944, Serial No. 550,574

6 Claims. (Cl. 123—80)

This invention relates to a valve for internal combustion engines which has for its principal object the provision of a highly efficient self-sealing rotary valve which will replace the usual reciprocating or tappet type valve.

Other objects of the invention are: to provide a rotary valve construction which will expose the spark plug or ignition device to the cylinder gases only at the instant of explosion, so that the plug will not be subjected to burning and corroding from the hot cylinder gases; to provide a combustion chamber externally of the engine cylinder; to provide highly efficient means for sealing the various valve ports to the valve so as to eliminate leakage at the points of entrance; and to provide means for effectively cooling and lubricating the valve while in operation.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a longitudinal, fragmentary section through the head of a typical internal combustion engine cylinder;

Fig. 2 is a cross-section therethrough taken on the line 2—2, Fig. 1;

Fig. 3 is a similar section taken on the line 3—3, Fig. 1;

Fig. 4 is a similar section taken on the line 4—4, Fig. 1;

Fig. 5 is a vertical section taken on the line 5—5, Fig. 1;

Fig. 6 illustrates a section similar to Fig. 5 showing an alternate construction for the rotary valve;

Fig. 7 illustrates an alternate form of sealing plate such as used in the alternate form of Fig. 6; and Fig. 8 is a detail view of the sealing ring employed in Figs. 6 and 7.

In the drawings a typical internal combustion engine cylinder block is indicated at 10 with a cylinder therein at 11 and a piston at 12. The cylinder block is provided with the usual water cooling jacket 13. A cylinder head 14 is secured over the cylinder 11 by means of suitable cap screws 15. The cylinder is provided with a cylinder port 16 opening toward the head 14 and preferably, but not necessarily, positioned concentrically with the cylinder 11.

The cylinder head 14 is formed with an inverted, conical valve seat 17 which opens completely through the upper and lower faces of the head 14, the smaller diameter being positioned adjacent the cylinder 11. This valve seat is concentric with the cylinder port 16 and is designed to receive a hollow conical rotary valve 18 having a shape and size to fit snugly against the walls of the valve seat 17. A concentric nipple 19 projects downwardly from the valve 18 into a counterbore 20 in the head of the cylinder 11. This nipple is grooved to receive a suitable sealing ring 21 which contacts the wall of the counterbore 20.

A stub shaft 22 projects axially upward from the valve 18 through a cylinder cap 23 which is also held in place by means of the cap screws 15. The shaft 22 carries a bevel gear 24 or other suitable device by means of which the shaft and the valve 18 may be rotated. At the point where the shaft 23 passes through the cap 23, a suitable packing gland 46 is provided having a packing nut 25 for sealing the shaft 22.

A valve passage 26 extends from a central port 28 at the lower face of the valve 18 to an eccentrically positioned valve port 27 at the upper face of the valve 18. The valve port 27 is surrounded by a radially and axially expansible sealing ring 29 mounted in a counterbore in the valve 18 around the port 27. This sealing ring seals the passage 26 to the lower face of the cap 23. A similar sealing ring 30 is positioned in a circular groove on the opposite side of the upper face of the valve 18. This ring also presses against, and slides on, the lower face of the cap 23. The ring 30 is intended both to balance the pressure of the ring 29 and to serve as an oil spreader for spreading oil over the lower surface of the cap.

The oil is supplied through an oil passage 31 in the shaft 23 to an oil chamber 32 in the interior of the valve 18. From thence, this oil is distributed through a passage 33 to the ring 30 and a passage 34 to the ring 21. The oil also flows through a third passage 35 to an oil groove 36 in the surface of the valve seat 17. Excess oil is drawn from the groove through an oil drain passage 37.

A triangular sealing ring 50 is positioned in a triangular ring groove in the top of the cylinder 11 and rides against the bottom face of the valve 18 to assist in sealing at this point, and also to act to block the flow of oil direct to the drain passage 37.

A spark plug 38 or other suitable ignition device is installed through the cap 23 and extends into a combustion chamber 39 therein. The cap 23 is provided with an exhaust passage 40 discharging therefrom and opening to the valve 14 diametrically opposite the spark plug and in a position to align with the valve port 27. An intake passage 41 is similarly formed in the cap 23, and positioned in alignment with the path of the port 27.

A sealing plate 42 covers the entire valve and is forced upwardly against the bottom of the cap by means of suitable springs 43. The sealing rings 29 and 30 pass through the plate 42 so as to rotate the plate with the valve. This plate serves to seal the passages 40 and 41 when they are not in alignment with the valve port 27.

It is believed the operation of the valve can be readily understood from the above description.

Briefly, the valve 18 rotates at one-half engine speed. Therefore, when the piston 12 is descending on the intake stroke the valve passage 26 is aligned between the intake passage 41 and the cylinder passage 16 so that gas is being drawn into the cylinder. As the piston rises, the valve will have turned to seal both passages 40 and 41, so that the gas is compressed in the top of the cylinder and in the passage 26. At the ignition point the passage 26 aligns with the combustion chamber 39 and the spark occurs to explode the gases against the piston 12. On the next ascent of the piston 12 the passage 26 aligns with the exhaust passage 40 to allow the burned gases to exhaust from the cylinder.

In Fig. 6 an alternate construction of the invention is illustrated. In this construction, a solid rotary valve 57 is employed in place of the hollow valve of Fig. 1. This valve is rotated by means of a suitable shaft 44 having a splined lower extremity 45 which fits into a splined socket in the valve 57. The shaft 44 is constantly urged downwardly into the valve 57 by means of a packing nut 25 which acts against a shoulder 47 on the shaft 44. This shaft is also provided with a central oil passage 48 from which the oil feeds into diametrically drilled passages 49 in the valve 57, and from thence to the various surfaces to be lubricated. This form of the valve operates exactly the same as the previously described form.

In both forms of the valve, and more particularly in the first form, the oil not only serves to lubricate the friction surfaces but also acts as a cooling agent to carry heat from the valve interior through the oil drain passage 37.

There is at times a tendency for the rotating sealing plate 42 to wear or burnish circular scratches in the plate and in the head 23. In Fig. 7 a construction for avoiding this and for more uniformly distributing the oil is illustrated. This comprises a sealing plate 53 having an eccentric groove 54 formed in its upper surface. A guide screw 55 is threaded through the head 23 so that its point will ride in the groove 54. Since the groove 54 is eccentric of the axis of the sealing plate the latter will be forced to simultaneously gyrate in an eccentric path while it rotates about its axis. Thus the plate is constantly shifted from a circular path so that it cannot wear or burnish the two frictional surfaces in any definite circular path.

In order to accommodate for the eccentric shifting of the plate, the port ring holes and the shaft hole therein are enlarged or elongated as shown at 55 and 56, respectively.

A key pin 51 may be formed on both plates 42 and 53 to enter a suitable receiving socket 52 in the valve to transmit the rotation of the valve to the plate. In the form of Fig. 6 the socket for the pin must be elongated radially in order to accommodate for the eccentricity of the plate movement.

An alternate form of sealing ring is illustrated in Fig. 6 consisting of an L-shaped ring having a thin flexible cylindrical skirt portion 58, frictionally engaging the wall of a nipple counterbore 62 and a relatively heavier base portion 59, frictionally engaging the bottom of the valve 57. An annular spiral spring 60, positioned in a receiving groove in the cylinder head, constantly urges the base portion into sealing contact with the valve. It will be noted from Fig. 8 that the skirt portion 58 of the ring is normally expanded at its thin edge so that when forced into the counterbore it will be contracted to maintain a firm sealing contact with the wall of the counterbore. The skirt portion 58 is split as shown at 62 to allow for the construction thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A rotary valve for the head of an internal combustion engine cylinder comprising: a port in the head of said cylinder; a rotary valve positioned in said head in axial alignment with said port; a valve passage in said valve, the first extremity of said passage being axially positioned at one face of said valve in alignment with said port, the second extremity of said valve passage being positioned to one side of the axis at the opposite face of said valve; an intake passage, an exhaust passage respectively in the cylinder head, said latter two passages being positioned to one side of the axis at the opposite face of said valve to register with the second extremity positions of said valve passage; a combustion chamber also positioned to register with the positions of the second extremity of said valve passage; ignition means in said combustion chamber; a sealing plate interposed between said valve and said head and having an opening therein corresponding to the second extremity of said valve passage; a sealing ring in said latter opening, said ring contacting both said head and said valve; and means for urging said plate against said head.

2. The combination with a rotary valve having a valve passage extending between two opposite flat faces thereof, said faces extending substantially at right angles to the axis of said valve, of a sealing ring surrounding said passage at one face thereof, said ring being imbedded in said valve so as to rotate therewith; and a sealing plate on the latter face of said valve, said ring projecting through said plate to rotate the latter.

3. In a rotary valve of the frusto-conical type having valve passages opening eccentrically through its larger face and a head member covering said larger face and provided with a head opening positioned in the path of said valve passages, means for sealing said valve to said head member comprising: a sealing plate interposed between said larger face and said head member and having plate openings in alignment with said valve passages; axially-expansible sealing rings surrounding said plate openings and extending through both sides of said plate to contact both the head member and the said larger face; and means for maintaining said rings concentric of said valve passages.

4. In a rotary valve of the frusto-conical type having valve passages opening eccentrically through its larger face and a head member covering said larger face and provided with a head opening positioned in the path of said valve passages, means for sealing said valve to said head member comprising: a sealing plate interposed between said larger face and said head member and having plate openings in alignment with said valve passages; and axially-expansible sealing rings surrounding said plate openings and extending through both sides of said plate to contact both the head member and the said larger face, there being a counterbore in said latter face about each of said valve passages into which said rings extend to maintain the latter concentric with said valve passages.

5. In a rotary valve of the frusto-conical type having valve passages opening eccentrically through its larger face and a head member covering said larger face and provided with a head opening positioned in the path of said valve passages, means for sealing said valve to said head member comprising: a sealing plate interposed between said larger face and said head member and having plate openings in alignment with said valve passages; and annular, axially-expansible members passing through said plate and contacting both said head member and said valve, there being corresponding sockets in said larger face for receiving said annular members to cause said plate to rotate with said valve.

6. In a rotary valve of the frusto-conical type having valve passages opening eccentrically through its larger face and a head member covering said larger face and provided with a head opening positioned in the path of said valve passages, means for sealing said valve to said head member comprising: a sealing plate interposed between said larger face and said head member and having plate openings in alignment with said valve passages; annular, axially-expansible members passing through said plate and contacting both said head member and said valve, there being corresponding sockets in said larger face for receiving said annular members to cause said plate to rotate with said valve; and means for conducting lubricant to certain of said annular members to be spread by the latter on said head member.

CHARLES W. HALL.